United States Patent [19]

Fifer

[11] Patent Number: 4,821,837

[45] Date of Patent: Apr. 18, 1989

[54] PEDESTAL CONTROL CONSOLE FOR VEHICLES

[75] Inventor: Jerry R. Fifer, Chapin, S.C.

[73] Assignee: Champion Road Machinery Limited, Goderich, Canada

[21] Appl. No.: 120,929

[22] Filed: Nov. 16, 1987

[51] Int. Cl.$^4$ ............................................. B62D 1/18
[52] U.S. Cl. ..................................... 180/334; 74/493; 180/315; 280/775
[58] Field of Search .................. 180/315–334; 74/491, 492, 493, 479, 484 R; 280/775

[56] References Cited

U.S. PATENT DOCUMENTS

| | | | |
|---|---|---|---|
| 4,392,546 | 7/1983 | Brown et al. | 180/326 |
| 4,580,647 | 4/1986 | Peifer et al. | 180/326 |
| 4,580,650 | 4/1986 | Matsuda | 180/326 |
| 4,664,221 | 5/1987 | Loney et al. | 180/334 |
| 4,682,787 | 7/1987 | Ruhter et al. | 180/334 |
| 4,706,776 | 11/1987 | Hyoki et al. | 180/334 |

Primary Examiner—Richard A. Bertsch

[57] ABSTRACT

A control arrangement for construction equipment of the type having a number of actuators disposed at the operator's station advantageously transfers the pivotal movement of the actuators about a shaft to a position inboard of actuators to cause a sympathetic movement of crank arms disposed on the pivot axis of the shaft at the inboard position. The transfer of the pivotal movement is completed by elongate bridge connectors suitably placed about the circumference of the bearing portions of the actuators to avoid interference. Independent movement of the actuators is maintained while transferring the pivotal movement to the inboard position in that only a limited pivotable movement is required and the full circumference of the bearings is available for selective placement of the bridge connectors.

30 Claims, 6 Drawing Sheets

PEDESTAL CONTROL CONSOLE FOR VEHICLES

BACKGROUND OF THE INVENTION

The present invention is directed to vehicle controls and to control systems which are adjustable and include a number of manual actuators associated therewith. In particular, the vehicle control is for use with motor graders.

In the operation of heavy equipment, such as construction equivalent, tractors, road graders, logging machinery, etc., a number of manually operated actuators are provided on a steering column or adjacent a steering column which are used by the operator for controlling various functions of the machine. Controls of this type typically adjust hydraulic control values and its is preferable to have a lever arrangement which provides a mechanical advantage for adjusting the control valves as is now the case. It is also preferable to have actuators which move easily, are sensitive to movement and considered light to actuate.

The control arrangement, including the steering wheel and actuators, should be adjustable to accommodate different operators and different operating positions. This is particularly important in road graders where, due to the diversity in operations of the grader and the varying degree of accuracy, the operator may choose different operating positions.

In operating heavy construction equipment, a further consideration is the operating visibility and the cabs of the vehicles are designed to increase visibility. The control systems of the prior art partially obstruct this visibility as can be appreciated in considering the structure disclosed in U.S. Pat. No. 3,737,003 and Reissue U.S. Pat. No. Re. 31,646.

Pedestal mount steering columns are normally mounted on the center line and do not substantially obstruct visibility. Visibility can be improved by maintaining the width of the pedestal relatively narrow. Any cables or linkage arrangements should be in close proximity to the pedestal, however, for operator ease, the actuators must be spaced from the center line of the pedestal a much greater distance. The control console should take into account the host of operating positions and the physical requirements for the operator to control the grader by means of the hand and foot controls.

SUMMARY OF THE INVENTION

The present invention uses the standard known position of the free ends of control levers and supports the levers on a common shaft by separate bearings in the manner of some prior art structures. In order to increase visibility and reduce clutter, the bearings are split into two portions connected by a rigid bridge such that control linkages and cables can be concentrated adjacent the center line of the pedestal. The bearings overlap and the outward portions of each bearing are positioned at one end of the shaft and the inward portions of each bearing are grouped at an inboard position on the shaft.

According to an embodiment of the invention, an adjustable control console for a vehicle comprises a support bracket attached to the vehicle adjacent the operator station and a pivotal pedestal having a lower end pivotally attached to the support bracket and extending substantially upward therefrom. The pedestal cooperates with the bracket to define a pivot axis about which the pedestal moves, and the pedestal has a clear area adjacent the lower end of the pedestal aligned with the pivot axis. A plurality of manual operable control elements, each of which are pivotally movable about a neutral position, are located adjacent an upper end of the pedestal and have an associated crank arm and link member which move in response to movement of the respective control element. Each link member at a distal end thereof has a pivotal connection with a second crank arm which in turn is pivotal about an axis adjacent the support bracket with the link member, the pivotal connection of the distal end in a neutral position of the respective control element being aligned with the pivot axis whereby movement of the console about the pivot axis occurs independent of movement of the second crank arm when said control elements are in the neutral position.

According to the invention, the control arrangement is provided by having a number of actuators, each pivotal about a common shaft, with these actuators being movable from a neutral position to a first operating position and from a neutral position to a second operating position, with said first and second positions being located to opposite sides of the neutral position. Each actuator has a bearing portion about the shaft to accommodate pivotal movement of the actuators about the shaft and each actuator includes bridge means extending laterally along the shaft connecting the respective bearing portion with a slave bearing portion carried by the shaft at a position spaced from the respective bearing portion. The slave bearing portion includes a crank arm connected thereto which moves in response to movement of the actuator for moving connected rods or control cables associated with hydraulic control valves.

BRIEF DESCRIPTION OF THE DRAWINGS

Preferred embodiments of the invention are shown in the drawings, wherein.

DETAILED DESCRIPTION OF THE PREFERRED EMBODIMENTS

There are several distinct aspects of the invention which are all shown in the drawings. All of these aspects are asociated with the control console of heavy construction equipment and particularly control consoles associated with motor graders.

Figure 1:
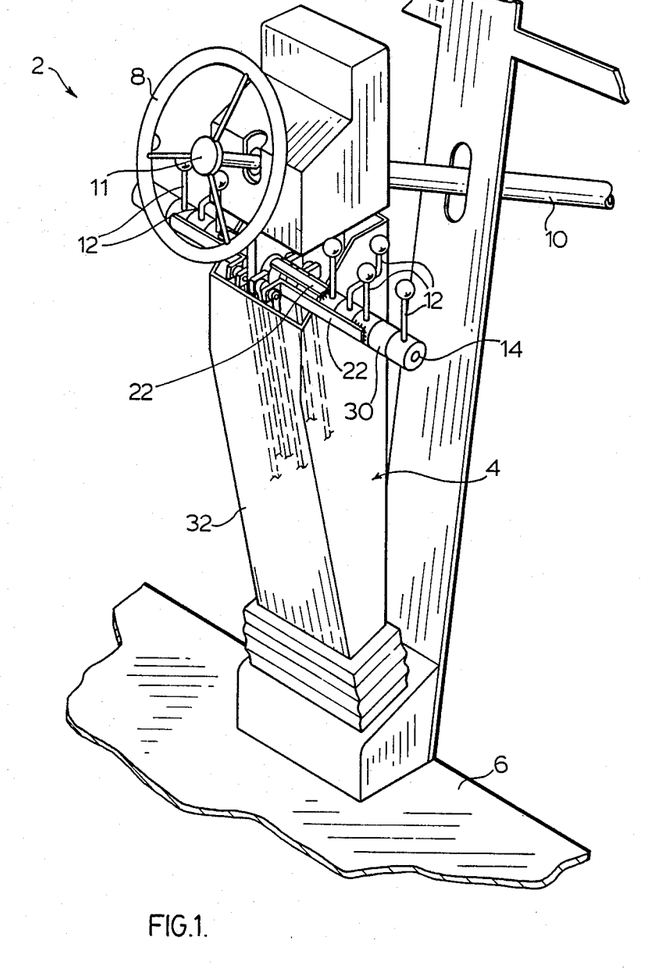
FIG. 1 is a perspective view of the control console.
Figures 4, 5:
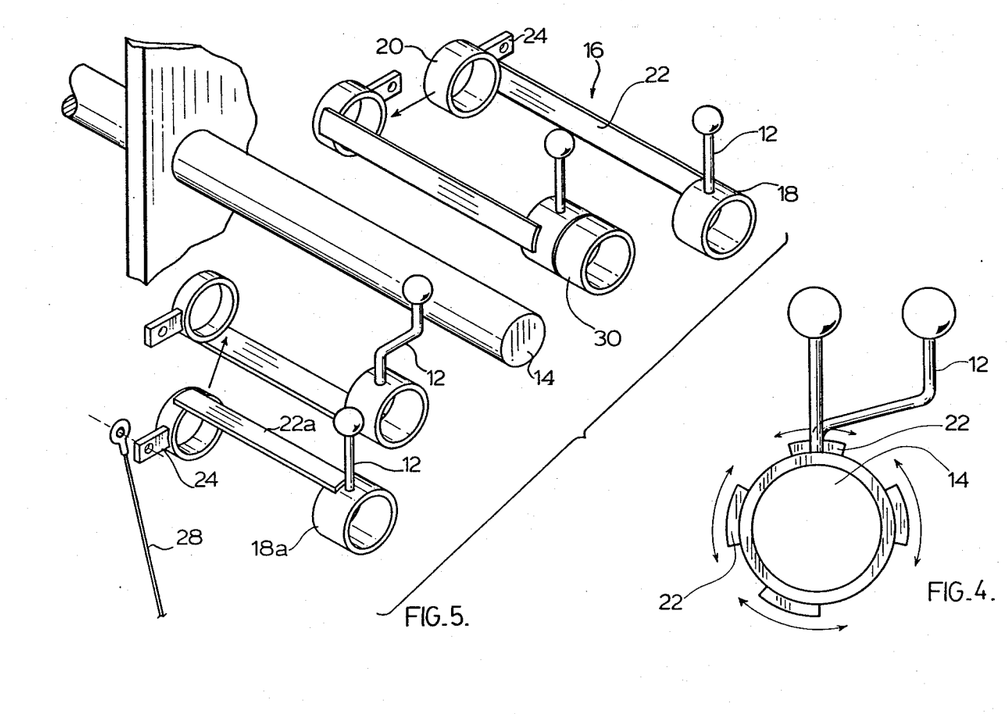
FIG. 4 is an end view of the shaft on which the actuators are mounted.
FIG. 5 is an exploded perspective view of the manual actuators carried on the support shaft.

A control console 2 is shown in FIG. 1 and includes the pivotted pedestal 4 secured at the lower end to the floor 6 of a grader cab. The control console includes at the upper end of the pivotted pedestal 4 a steering wheel 8 and an associated telescoping steering wheel column 10 which is adjustable in length. As the length of the steering column is increased or decreased, the angle of the pedestal relative to the floor 6 is altered. A release 11 is provided at the center of the steering wheel for selectively releasing or locking of the steering column 10 at a particular length. The lower portion of the pedestal 4 has a axis of rotation parallel to the floor and the particular angle of the pedestal is adjusted by adjusting the length of the steering column 10. A grader control console also requires a number of control levers 12 which in this case are rotatably supported on a fixed shaft 14 extending either side of the center line of the control console 2. Each control lever 12 has a unique bearing 16 shown in FIG. 5 which is journalled on the fixed shaft 14. Each bearing 16 includes a first bearing portion 18 which serves to connect the particular control lever 12 to the particular bearing 16. The bearing 16 includes a second or slave bearing portion 20 which is rigidly connected to the first bearing portion 18 by means of the rigid bridge 22. As shown in FIG. 5, the shaft is generally divided either side of the center of the console into two sections with the bearing 16 located to one side of the center line of the console cooperating as a set with the bearing portions 18 and 20 of each bearing cooperating with adjacent bearings such that the rotational movement of a first bearing portion is transmitted to the slave bearing portion 20 by the particular bridge 22 and in a way to avoid interference with associated first or second bearing portions. Thus, the rotational movement applied to a first bearing portion is transmitted to an inboard position and each of the second or slave bearing portions 20 includes a crank arm 24 which extends generally perpendicular to the shaft and preferably generally perpendicular to the longitudinal dimension of the control console. Each crank arm 24 is used in translating the limited rotational movement of a control lever 12 about the fixed shaft 14 into a generally linear movement suitable for a connecting rod or a solid cable. For example, a connecting rod could be attached to the crank arm 24 by means of the circular aperture 26 and this connecting rod would either by pulled or pushed generally in its length, depending upon its particular movement of the associated control lever 12. The translation of the limited rotational movement of the control lever into a push or pull motion by means of a crank arm is old, however, the particular bearing associated with each control lever 12 allows the transmission of the rotational force to an inboard position where the particular slave bearing portion 20 cooperates with a connecting rod or a solid cable in the conventional manner. This transmission to the inboard position is a result of a rigid bridge 22 associated with each bearing with this rigid bridge only having a limited circumferential extent and each bridge is associated with a first bearing portion and a second bearing portion and secured thereto cooperate with other bearings and other connecting bridges. The connecting bridges are generally disposed about the circumference of the bearing 16 and are of a width such that the spacing between bearing portions is sufficient to ensure that there is no interference between movement of actuators and all actuators move independently of any other actuators.

A further problem can be appreciated in that the bridge portions 22 must be located to avoid interference with the crank arms 24. In the case of the four actuators as shown in FIG. 5, two of the crank arms 24 extend to one side of the shaft and two extend to the opposite side of the shaft. The innermost first bearing portion 18a has the bridge 22a secured on the top and, in this way, there can be no interference between bridge 22a and the other control levers 12. The bridge portions 22 located on the sides of the bearing portions 18 and 20 are associated with the outer two crank arms. The last connecting bridge is on the bottom of the shaft and is shown connected to the second innermost crank arm. Certain variations of this are possible, however, the point is that the bridges 22 must be appropriately located so that each lever is independently movable. Some restrictions have been placed on the particular structure in that we wish to have two arms extend to one side of the shaft and two arms extend to the other. With these arms being perpendicular generally to the length of the console, if other angular positions of the arm are convenient, the problems asociated with placement of the bridges may be eased. The particular arrangement shown in very convenient in that the connecting rods 28 in the case of a linkage arrangement or rigid cables which could replace the connecting rods 28 extend in the length of the console and are positioned generally adjacent the center of the console. By positioning the arms to either side of the shaft, there is more room to allow connection of these connecting rods to the crank arms as can be appreciated from a review of FIG. 8.

FIG. 4 shows how each of the control levers 12 is independently movable with the limited angle of movement of each lever shown by the arrow associated with each bridge. Note that in one case there is a higher angular degree of movement, in that one particular control lever may require a larger angle as it not only moves between a first position and a second position either side of neutral, but it moves through either the first or second position to a float position which is accommodated by the larger angle of movement. Thus, the position of the bridges may be selected to accommodate different lever movement.

Figure 7:
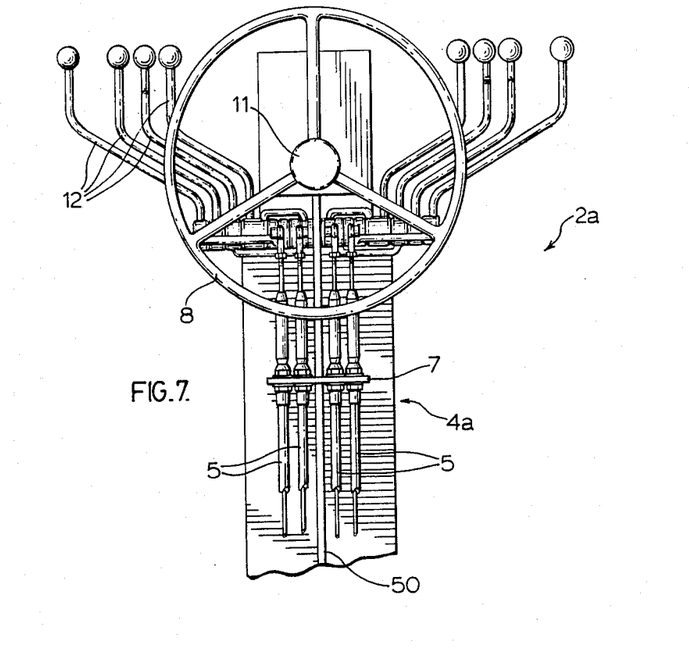
FIG. 7 is a front view of a modified control console.

Returning to FIG. 1 for a movement, intermediate some of the bearings portions 18 is a spacer 30. This spacer serves to separate two of the control levers 12 and may be convenient if straight levers are used. In our further embodiment as shown in FIG. 7, bent control levers are used and spacers are avoided. This allows a shortening of the length of the fixed shaft 14 and thus increases the visibility to a certain extent.

One aspect that is important with respect to control systems for motor graders is the placement of the control levers and, in particular, the placement of the ends of the control levers 12. Grader operators are quite skilled and become very familiar with the placement of these control levers and find it awkward to adjust should the position be altered. thus, it is important to keep the end of the control levers in their same relative position, however there is a great deal of flexibility with respect to how there control levers are connected to the particular bearing portions. In the embodiment shown in FIG. 7, bent control levers are used to reduce the size of the shaft and reduce the clutter associated with the first and second bearing portions located on the shaft, however, this is done at the expense of a somewhat more complicated bent lever configuration which still results in the ends of the levers being in the same relative position.

As shown in FIG. 1, the particular bearing sets have allowed the positioning of the connecting rods at an inboard position very close to the center of the control console and to either side of the shaft. This has freed a large area beneath the control levers 12 for increased visibility as this is the area that would generally be used to accommodate the connecting rods 28. In addition, because of the very consolidated state which has been accomplished each side of the control console, a slim plastic covering housing can be placed about the control console concealing the various connecting rods.

Figures 2, 3:
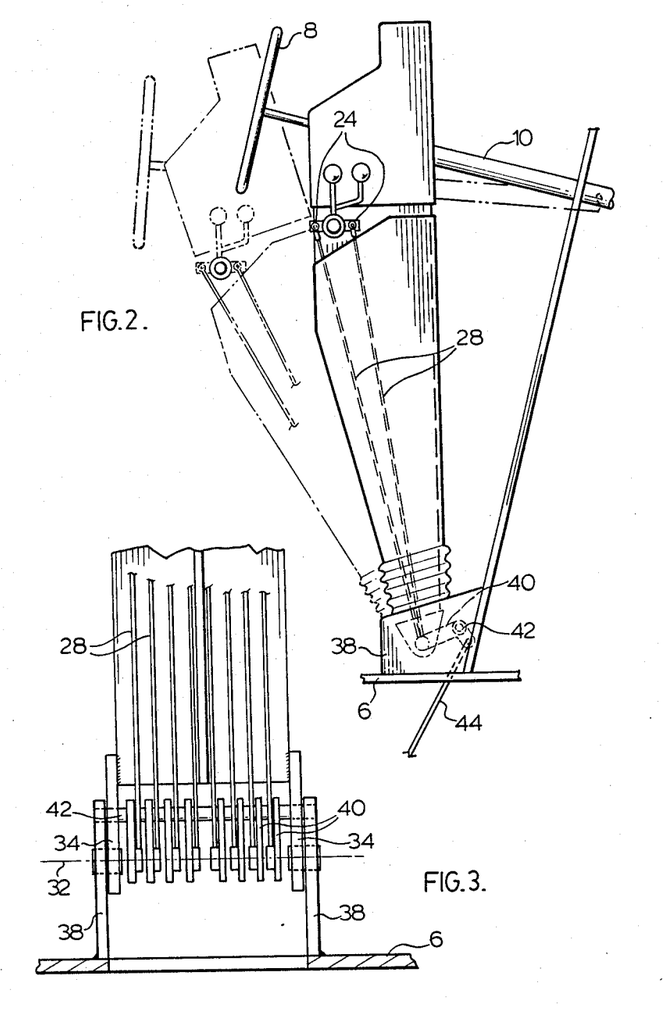
FIG. 2 is a side view showing the pivotal movement of the control console.
FIG. 3 is an end view showing the interior of the lower portion of the control console.
Figure 6:
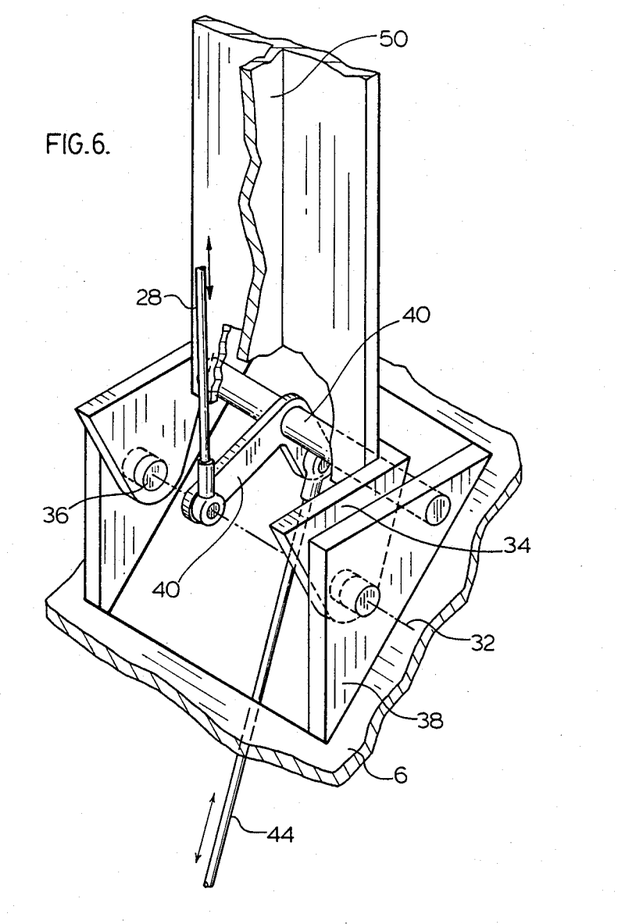
FIG. 6 is a partial perspective view showing a lower portion of the linkage arrangement at the base of the pedestal.

As previously mentioned, it is important to have a control console, the position of which is adjustable, and the pedestal 4 as shown in FIGS. 2, 3 and 6 pivots about the axis 32 fixed relative to the floor 6 of the cab. The lower portion of the pedestal has two depending members 34 with apertures 36 for securement with the floor brackets 38. In this case, a pin can be inserted in the apertures in the floor bracket and in the depending arms such that each depending arm is pivotally secured to allow rotation of the pedestal about the pivot axis 32. The center area between the depending members 34 is clear and this allows the connecting rods 28 to have one end thereof positioned on the pivot axis 32 for effecting a pivot connection with an arm of a bell crank member 40. The bell crank itself is pivotted on shaft 42 with the opposite end of the bell crank connected to a further connecting rod 44. The position of the one bell crank 40 shown in FIG. 6 would be the position with the appropriate control lever 12 in the neutral position. Thus, movement of the control lever in one direction will cause a downward or upward movement of the bell crank and movement in the opposite direction will cause the bell crank to have the opposite movement. With all control levers in the neutral position, movement of the pivotted pedestal 4 about the pivot axis 32 will not cause any movement of the bell cranks 40, nor will it cause a movement of the shaft 42 as it is held stationary in the floor brackets 38.

Figure 8:
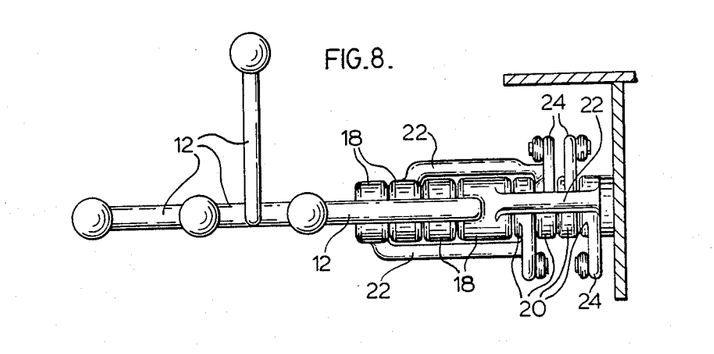
FIG. 8 is a top view of one side of the modified control console.
Figure 9:
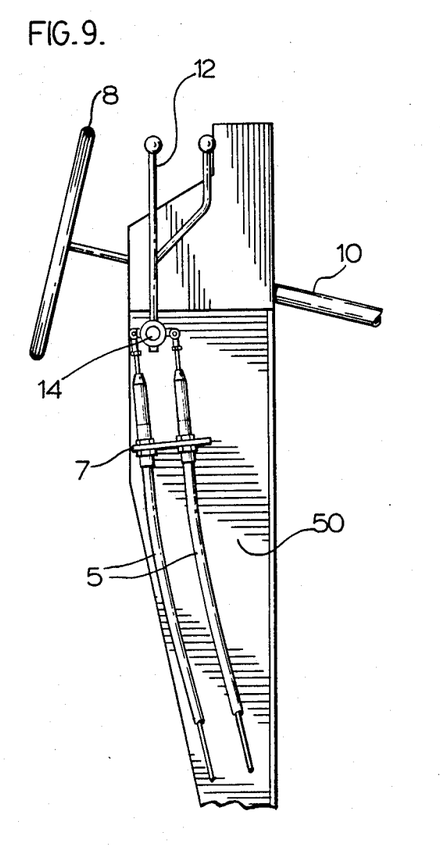
FIG. 9 is a side elevation of the modified control console.

The modified control console 2a of FIG. 7 through 9 has the pivotted pedestal shown as 4a which is attached to the floor of the grader in the manner of the structure of FIGS. 1 through 6. This modified console uses solid control cables 5 which are secured to the pivotal pedestal 4a by bracket member 7. Each control cable is secured to one of the crank arms 24 of the second or slave bearing portions 20. Each of these slave bearing portions 20 are connected by a rigid bridge 22 to a first bearing portion 18. This is the general arrangement of FIGS. 1 through 6, however, in this case, the separation between the first bearing portion and its respective slave bearing portion and the overall length of the fixed shaft 14 has been reduced and the bearings are now contained on a shaft 14 which is generally within the envelope defined by the periphery of the steering wheel 8 as shown in FIG. 7. This arrangement has significantly reduced the length of the fixed shaft 14 on which each of the first and second bearing portions 18 and 20 are supported, and the free end of the control levers 12 cannot be located immediately above these first bearing portions 18. As disclosed earlier, operators become accustomed to a particular placement of the free end of the control levers and various separations between these ends and as such, the control levers 12 have a bent configuration to move the free ends outwardly of the envelope defined by the steering wheel into the accepted position for the free ends within the industry. This arrangement does increase the length of the control levers 12 and, thus, the load exerted on the bearings is increased due to cantilevered loading. By splitting the bearing portions and having, in effect, two bearings separated on the shaft, the strength of these bearings in opposing any undesirable loads exerted thereon by the control levers 12 is increased. Therefore, the concept of a first bearing portions rigidly connected to a slave bearing portion at a point on a shaft spaced from the first bearing portion not only allows the control linkage, be it connecting rods 28 or control cables 5, to be concentrated generally at the center of the pedestal, but it also provides a simple, strong bearing arrangement.

In the modified arrangement of FIG. 7, the control levers 12 are connected to the first bearing portions 18 by a generally upright portion which then angles outwardly and upwardly and finally terminates in a generally upright portion. This generally upward and outward angling of the control levers 12 reduces the obstructed area, creating an additional triangular like window below the outer control lever 12 and terminating at the axis of the shaft 14. This triangular window is not realized in the control console of FIG. 1 through 6 nor is it realized in the patents referred to previously. It should be noted that some other control arrangements have used bent levers which are angled in this manner, however, they have not done so in combination with the particular first bearing portions and second bearing portions and concentration of the control linkages or cables at the center point of the pedestal. Reducing obstruction by concentrating on the cables is enhanced by this particular angling of the control levers and increases the visibility with respect to the grader blade which is visible through this area below the front of the cab.

Many arrangements for the placement of the control cables 5 or connecting rods 28 to the crank arms 24 are possible, however, the arrangement in FIGS. 7 through 9 is desirable in that, as shown in FIG. 8, the connection of the control cables to the crank arms 24 is not difficult as, one side of the shaft 14, two crank arms are shown placed in back-to-back relationship with the connection points being to the exterior with these crank arms being on the intermediate slave bearing portions 20. The outer slave bearing portions have their crank arms 24 spaced and the connection to the control cables is provided to the interior. Thus, there is an overlap, as can be appreciated from FIG. 8, in the position of the connection point of the control cables to the arms which is possible due to the arms extending to opposite sides of shaft 14 and by having bracket 7 have two separate positions for control cables. The embodiment of FIGS. 7 through 9 is believed to be an enhancement of the control console of FIGS. 1 through 6. If desired, thrust washers may be placed between the various bearing portions to ensure independent movement of each bearng portion.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a vehicle control having at least four control levers each connected to separate bearings journalled on a common shaft and independently movable through a limited angle of rotation about said shaft, each bearing being divided into a first bearing portion having a control lever connected thereto and which cooperates with and is connected by a rigid bridge member to a spaced slave bearing portion carried by said common shaft, the space intermediate said slave bearing portion and said first bearing portion of each bearing accommodating at least one bearing portion of a separate bearing.

2. In a vehicle control, a plurality of bearings journalled on a common shaft, each bearing has a first bearing portion and a separated second bearing portion joined by a bridging member, said first bearing portion being adapted for connection with a control lever and said second bearing portion acting as a slave relative to said first bearing portion and including a crank arm extending generally radially therefrom, said bridging members being of a limited circumferential extent and spaced one from the other about the circumference of the bearing portions to allow limited rotational movement of said bearing portions about said shaft, said slave bearing portions being located and grouped on one portion of said shaft and said first bearing portions located in a group on another portion of said shaft.

3. In a vehicle control as claimed in claim 2, wherein said bridging members are spaced one from the other to allow said bearings to each move through a similar angle from a similar radial position relative to said shaft.

4. In a vehicle control as claimed in claim 2, including a control lever for each bearing portion, said control levers extending in a similar direction to be generally aligned and each movable through an angle of about 20 degrees or greater and less than 40 degrees.

5. In a vehicle control as claimed in claim 4, wherein there are at least four bearings.

6. In a vehicle control as claimed in claim 4, wherein there are two separate groups of bearings, one group of bearings located to one side of a pedestal and the other group located to the opposite side.

7. In a control arrangement for a motor grader having at least four operator control levers movable through a limited angle and connected to separate bearings journalled on a common shaft, the improvement comprising each bearing having a first bearing portion and a second bearing portion spaced from the first bearing portion and interconnected by an elongated rigid bridge member of limited circumferential extent and secured to said first and second portions at a position to cooperate with the other bearing portions, said bearings cooperating one with the other with said first portions located in a group on said shaft and said second portions adjacent thereto as a group, the securement of said bridge members being at different radial locations to cooperate therebetween such that all control members move independently through their limited angle.

8. In a control system as claimed in claim 7, wherein each first portion is connected to one of said operator control levers and said second portions have crank arms integral therewith and extending in a radial direction, said bridge members being secured to said first and second portions such that said arms do not interfere with said bridge members during movement of said actuators.

9. In a control system as claimed in claim 8, wherein said bridge members are generally equal spaced about the circumference of said bearings.

10. In a control system as claimed in claim 9, wherein each bearing is cast as an integral piece.

11. In a control arrangement for a vehicle, said control arrangement including a plurality of generally aligned actuators all having limited pivotal movement about a common longitudinally extending shaft, at least some of said actuators including connecting means associated therewith extending laterally along said shaft overlaying the securement of at least some of said actuators to said shaft and extending to an inboard position of said shaft effecting a rigid connection with a crank are having a pivot axis aligned with the longitudinal axis of said shaft and operable to effect a limited pivotal movement in sympathy with a corresponding movement of the associated actuator; said connecting means being of an extent and positioned about the longitudinal axis to maintain independent the pivotal movement of each actuator and associated crank arm about said shaft.

12. In a control arrangement for a vehicle as claimed in claim 11, wherein said actuators are provided at one end of said shaft and said crank arms for said actuators are positioned on said shaft inboard of said actuators, said crank arms being spaced one from the other along the shaft at a distance less than the space between said actuators.

13. In a control arrangement as claimed in claim 12, wherein said connecting means are generally equally spaced about the shaft.

14. In a control arrangement as claimed in claim 11, wherein four actuators are provided at one end of said shaft and four crank arms are provided, two of said crank arms extending in one direction from said shaft and two extending in the opposite direction.

15. A motor grader vehicle control arrangement comprising:
a shaft,
a plurality of generally similarly configured actuators pivotally secured on said shaft adjacent one end thereof each for movement through a similar acute angle,
a crank arm associated with each actuator and disposed on said shaft and pivotal thereabout at a position inboard of said actuators, and
bridge means joining each actuator with a respective crank arm such that each actuator and respective crank arm are independently movable relative to the other crank arms and actuators.
each bridge means being spaced to one side of said shaft and extending therealong to overlie bearing portions of any actuators therebetween,
said control arrangement providing crank arms at an inboard position on said shaft spaced from the pivotal securement of said actuators to said shaft.

16. A vehicle control as claimed in claim 15, wherein said bridge means are selectively spaced about the circumference of said shaft and are each of a limited circumferential such that interference between bridge means, actuators and cranks arms by movement of said actuators is avoided.

17. A vehicle control arrangement as claimed in claim 15, wherein four actuators are grouped at one end of the shaft and cooperate with four crank arms located inwardly of said actuators, said bridge means being narrow elongated members each fixed relative to a respective actuator and crank arm and positioned to avoid interference between the actuators and the connecting means and the crank arms and the bridge means during normal operational movement of said actuators.

18. A vehicle control arrangement as claimed in claim 17, including a second group of four actuators at the opposite end of the shaft from the first group of actuators with all crank arms located therebetween.

19. A vehicle control arrangement as claimed in claim 18, wherein said shaft is carried on a pedestal which is pivotable and said shaft moves with said pedestal.

20. An adjustable control console for a vehicle comprising:
a support bracket means fixedly attached to said vehicle adjacent the operator's station.
a pivotable pedestal having a lower end pivotally secured to said bracket means and extending substantially upwardly therefrom,
said pedestal cooperating with said bracket means to define a pivot axis about which said pedestal moves and having a clear area adjacent said lower end of said pedestal aligned with said axis,
a plurality of manually operable control elements carried and pivotable about a shaft positioned adjacent an upper end of said pedestal, each control element having an associated crank arm and a link member which move in response to limited pivotable movement of the respective control element from a neutral position,
each link member at a distal end remote from said actuator having a pivotal connection with an end of a bell crank which itself is pivotable about an axis adjacent the support bracket means, and wherein the pivotal connection of the distal ends of the link members with said respective bell crank in a neutral position of the respective control element is aligned with said pivot axis,
wherby movement of said console about said pedestal pivot axis can occur independent of movement of said bell cranks when said control elements are in said neutral position.

21. An adjustable control console as claimed in claim 20, wherein said control elements include bearing portions carried and rotatable about said shaft, said shaft being attached to said pedestal and movable therewith.

22. An adjustable control console as claimed in claim 21, wherein crank arms associated with said control elements are carried and rotatable about said support shaft and disposed inwardly of all of said control elements with each crank arm connected to a respective control element by a connecting member running parallel with said shaft, said connecting members being spaced about said shaft to avoid interference therebetween in any operating position of said control elements.

23. An adjustable control console as claimed in claim 20, wherein said control elements are grouped, with a first group disposed to one side of the pedestal and a second group disposed to the opposite side of the pedestal, and the crank arms of the control elements are all centrally disposed intermediate said first and second groups.

24. An adjustable control console as claimed in claim 22, wherein four grouped control elements are disposed to either side of the pedestal and the control elements cooperate with cranks arms centrally disposed intermediate the control elements.

25. In a control arrangement for a construction vehicle having a number of actuators, each pivotable about a common shaft from a neutral position to a first operating position and from neutral to a second operating position with said first and second positions being located to opposite sides of said neutral position; each actuator having a bearing portion about said shaft to accommodate pivotal movement of said actuator about said shaft between said first and second positons and bridge connecting means extending laterally along said shaft connecting the respective bearing portion with a slave bearing portion carried by said shaft at a position spaced from said respective bearing portion; said slave bearing portion including a connected linkage means which moves in response to movement of a respective actuator, all slave bearing portions being grouped at said position spaced from said respective bearing portions.

26. In a control arrangement as claimed in claim 25, wherein each slave bearing portion includes a fixed crank arm extending in a direction generally perpendicular to a longitudinal axis of said linkage means when said respective actuator is in a neutral position, said crank arm pivotally connecting said linkage means to said slave bearing portion.

27. In a control arrangement as claimed in claim 26, wherein said bridge connecting means is elongate and of a width about one half of an inch and less than 1/5 of the circumferential extend of said slave bearing portions.

28. In a control arrangement as claimed in claim 27, wherein said connecting means are spaced one from the other about the circumference of said slave bearing portions and in a manner to maintain each actuator movable independent of the other actuators.

29. In a control arrangement as claimed in claim 25, wherein there are four grouped actuators on said shaft which, via said bridge connecting means, cooperate with four slave bearing portions disposed in series on said shaft at an inboard position.

30. In a control arrangement as claimed in claim 29, there are two groups each of four actuators, with each group disposed on opposite ends of the shaft, each actuator, via said bridge connecting means, cooperates with said respective slave bearing portion.

* * * * *